US010149312B2

(12) United States Patent
Yan et al.

(10) Patent No.: US 10,149,312 B2
(45) Date of Patent: Dec. 4, 2018

(54) RESOURCE SCHEDULING METHOD AND APPARATUS

(71) Applicant: Huawei Technologies Co., Ltd., Shenzhen (CN)

(72) Inventors: Junjie Yan, Shenzhen (CN); Li Li, Shenzhen (CN); Chaoyi Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 15/581,582

(22) Filed: Apr. 28, 2017

(65) Prior Publication Data
US 2017/0230991 A1   Aug. 10, 2017

Related U.S. Application Data

(63) Continuation of application No. PCT/CN2015/092750, filed on Oct. 23, 2015.

(30) Foreign Application Priority Data

Oct. 29, 2014   (CN) .......................... 2014 1 0594772

(51) Int. Cl.
*H04W 72/12* (2009.01)

(52) U.S. Cl.
CPC ... *H04W 72/1205* (2013.01); *H04W 72/1247* (2013.01)

(58) Field of Classification Search
CPC ........... H04W 72/1205; H04W 72/042; H04W 72/1247; H04W 24/10; H04L 5/001; H04L 5/0007; H04L 5/0048
See application file for complete search history.

(56) References Cited

U.S. PATENT DOCUMENTS

| | | | |
|---|---|---|---|
| 2013/0231125 A1 | 9/2013 | Jeon et al. | |
| 2014/0348096 A1 | 11/2014 | Nagata et al. | |
| 2015/0171984 A1 | 6/2015 | Jitsukawa et al. | |

FOREIGN PATENT DOCUMENTS

| | | |
|---|---|---|
| CN | 103051370 A | 4/2013 |
| CN | 103688585 A | 3/2014 |
| CN | 104066196 A | 9/2014 |
| EP | 2373076 A1 | 10/2011 |

(Continued)

OTHER PUBLICATIONS

Liu Zhanjun et al., "Cooperative RRU Selection Algorithm for Multicast Service in C-RAN Wireless Networks", Journal of Xidian University, vol. 40, No. 6, Dec. 2013, pp. 168-173.

*Primary Examiner* — Jamal Javaid
(74) *Attorney, Agent, or Firm* — Slater Matsil, LLP

(57) ABSTRACT

The method includes acquiring a working remote radio unit (RRU) set of a user equipment (UE), determining an RRU having the highest signal strength of the UE and screening the working RRU set based on the RRU having the highest signal strength, to generate a first paired RRU set of the UE, generating a paired UE set based on the first paired RRU set, determining whether an RRU exists in the first paired RRU set, when an RRU exists in the first paired RRU set, determining a second paired RRU set of the UE according to the first paired RRU set and the paired UE set and determining an actual user attribute of the UE according to the second paired RRU set and an initial user attribute of the UE, and scheduling a resource for the UE according to the actual user attribute of the UE.

20 Claims, 6 Drawing Sheets

(56) References Cited

FOREIGN PATENT DOCUMENTS

| EP | 2941039 A1 | 11/2015 |
|----|------------|---------|
| EP | 3148279 A1 | 3/2017 |
| JP | 2013110671 A | 6/2013 |
| JP | 2013187909 A | 9/2013 |
| JP | 2014195251 A | 10/2014 |
| WO | 2014033772 A1 | 3/2014 |
| WO | 2014101336 A1 | 7/2014 |

RESOURCE SCHEDULING METHOD AND APPARATUS

CROSS-REFERENCE TO RELATED APPLICATIONS

This application is a continuation of International Application No. PCT/CN2015/092750, filed on Oct. 23, 2015, which claims priority to Chinese Patent Application No. 201410594772.2, filed on Oct. 29, 2014. The disclosures of the aforementioned applications are hereby incorporated by reference in their entireties.

TECHNICAL FIELD

The present embodiments relate to the field of communications technologies, and in particular, to a resource scheduling method and apparatus.

BACKGROUND

In the communications field, a single-frequency network is generally used in an LTE (Long Term Evolution) system, and consequently, relatively severe inter-cell interference is caused, and particularly in a network whose site density is high, interference is more obvious. A multi-RRU (remote radio unit) cell technology is generally used in the LTE system for scheduling a resource, to reduce interference when sites are deployed densely and obtain a combination gain.

Based on the multi-RRU cell technology, at present, when resource scheduling is performed, a logical cell is formed by using multiple RRUs, interference intensity of each UE is determined by measuring an uplink RSRP (reference signal received power) at which the UE (user equipment) in the logical cell arrives at each RRU in the cell, and further, a user attribute of each UE is determined according to the interference intensity of the UE, where the user attribute is all joint-scheduling UE, partial joint-scheduling UE, or independent-scheduling UE, so that resource scheduling is performed on each UE according to the user attribute of the UE. When the user attribute of the UE is all joint-scheduling UE, all UEs in the logical cell are collectively served by one RRU, and a resource is scheduled for the UE, or when the user attribute of the UE is partial joint-scheduling UE, some UEs having relatively strong interference in the logical cell are collectively served by one RRU, and a resource is scheduled for the UE; when the user attribute of the UE is an independent-scheduling user, an RRU having the weakest interference in the logical cell is used as a serving RRU of the UE, and a resource is scheduled for the UE.

In a process of implementing the present embodiments, the inventor finds that a related technology has at least the following problems.

During resource scheduling, user attributes of different users are determined mainly depending on a condition for detecting a signal and interference intensity, and users having different user attributes are processed without differentiation, causing relatively severe inter-cell interference and low resource utilization efficiency.

SUMMARY

To resolve a problem in a related technology, embodiments of the present invention provide a resource scheduling method and apparatus. The technical solutions are as follows.

According to a first aspect, a resource scheduling apparatus is provided, where the apparatus includes: an acquiring module, configured to acquire a remote radio unit (RRU) set of a user equipment (UE); a first determining module, configured to determine an RRU having the highest signal strength of the UE according to an reference signal received power (RSRP) at which the UE arrives at each RRU in the working RRU set; a first generation module, configured to screen the working RRU set based on the RRU having the highest signal strength, to generate a first paired RRU set of the UE; a second generation module, configured to generate a paired UE set based on the first paired RRU set; a judging module, configured to determine whether an RRU providing a service to the UE exists in the first paired RRU set; a second determining module, configured to: when an RRU providing a service to the UE exists in the first paired RRU set, determine a second paired RRU set of the UE according to the first paired RRU set and the paired UE set; a third determining module, configured to determine an actual user attribute of the UE according to the second paired RRU set and an initial user attribute of the UE; and a scheduling module, configured to schedule a resource for the UE according to the actual user attribute of the UE.

With reference to the first aspect, in a first possible implementation manner of the first aspect, the acquiring module is configured to: determine each RRU providing a service to the UE, to acquire the working RRU set formed by the RRUs, or determine, according to an isolation range of the UE, each RRU providing a service to the UE, to acquire the working RRU set formed by the RRUs.

With reference to the first aspect, in a second possible implementation manner of the first aspect, the second generation module is configured to: acquire UE served by each RRU in the first paired RRU set, and form the paired UE set by using the UEs served by the RRUs in the first paired RRU set, or acquire UE served by each RRU in the first paired RRU set, screen out a beamforming (BF) user from the UE served by each RRU, and form a paired UE set by using the BF users screened out.

With reference to the first aspect, in a third possible implementation manner of the first aspect, the apparatus further includes: a fourth determining module, configured to: when an RRU providing a service to the UE does not exist in the first paired RRU set, determine that the actual user attribute of the UE is the initial user attribute.

With reference to the first aspect, in a fourth possible implementation manner of the first aspect, the second determining module includes: a first determining unit, configured to determine a priority of each UE according to a service type of each UE in the paired UE set; a calculation unit, configured to perform correlation calculation on each paired UE in the paired UE set and the UE; a judging unit, configured to sequentially determine, according to the priorities in descending order, whether each paired UE has a correlation with the UE; a first processing unit, configured to: when paired UE having the highest priority has a correlation with the UE, acquire a working RRU of the paired UE having the highest priority, and delete the working RRU of the paired UE having the highest priority from the first paired RRU set, to obtain the second paired RRU set; and a second processing unit, configured to: when the paired UE having the highest priority does not have a correlation with the UE, sequentially determine, according to the priorities in descending order, whether rest paired UEs in the paired UE set have a correlation with the UE, and when paired UE having a correlation with the UE exists in the rest paired UEs in the paired UE set, process the paired UE having a correlation with the UE in a manner of processing the paired UE having the highest priority to obtain the second paired RRU set.

With reference to the fourth possible implementation manner of the first aspect, in a fifth possible implementation manner of the first aspect, the apparatus further includes: a fifth determining module, configured to: when UE having a correlation with the UE does not exist in the rest paired UEs in the paired UE set, determine that the actual user attribute of the UE is the initial user attribute.

With reference to the first aspect, in a sixth possible implementation manner of the first aspect, the third determining module includes: a first determining unit, configured to: when an RRU providing a service to the UE does not exist in the second paired RRU set, determine the actual user attribute of the UE according to the initial user attribute of the UE; and a second determining unit, configured to: when an RRU providing a service to the UE exists in the second paired RRU set, according to priorities in descending order, re-determine a new second paired RRU set according to rest paired UEs in the paired UE set and the first paired RRU set, until an RRU providing a service to the UE does not exist in the new second paired RRU set.

With reference to the sixth possible implementation manner of the first aspect, in a seventh possible implementation manner of the first aspect, the user attribute is an all joint-scheduling user, a partial joint-scheduling user, or an independent-scheduling user; and the first determining unit includes: a first determining subunit, configured to: when the initial user attribute of the UE is an all joint-scheduling user, determine that the actual user attribute of the UE is a partial joint-scheduling user; and a second determining subunit, configured to: when the initial user attribute of the UE is a partial joint-scheduling user, determine that the actual user attribute of the UE is an independent-scheduling user.

With reference to the seventh possible implementation manner of the first aspect, in an eighth possible implementation manner of the first aspect, the apparatus further includes: a processing module, configured to: when the UE is a BF user, perform weighted processing on a beam direction of the UE.

According to a second aspect, a resource scheduling apparatus is provided, where the apparatus includes: a processor; and a memory, configured to store an instruction that can be executed by the processor, where the processor is configured to: acquire a working remote radio unit RRU set of UE; determine an RRU having the highest signal strength of the UE according to an uplink reference signal received power RSRP at which the UE arrives at each RRU in the working RRU set; screen the working RRU set based on the RRU having the highest signal strength, to generate a first paired RRU set of the UE; generate a paired UE set based on the first paired RRU set; determine whether an RRU providing a service to the UE exists in the first paired RRU set; when an RRU providing a service to the UE exists in the first paired RRU set, determine a second paired RRU set of the UE according to the first paired RRU set and the paired UE set; determine an actual user attribute of the UE according to the second paired RRU set and an initial user attribute of the UE; and schedule a resource for the UE according to the actual user attribute of the UE.

With reference to the second aspect, in a first possible implementation manner of the second aspect, when acquiring the working RRU set of the UE, the processor is specifically configured to: determine each RRU providing a service to the UE, to acquire the working RRU set formed by the RRUs; or when acquiring the working RRU set of the UE, the processor is specifically configured to: determine, according to an isolation range of the UE, each RRU providing a service to the UE, to acquire the working RRU set formed by the RRUs.

With reference to the second aspect, in a second possible implementation manner of the second aspect, when generating a paired UE set based on the first paired RRU set, the processor is specifically configured to: acquire UE served by each RRU in the first paired RRU set, and form the paired UE set by using the UEs served by the RRUs in the first paired RRU set; or when generating the paired UE set based on the first paired RRU set, the processor is specifically configured to: acquire UE served by each RRU in the first paired RRU set, screen out a beamforming BF user from the UE served by each RRU, and form the paired UE set by using the BF users screened out.

With reference to the second aspect, in a third possible implementation manner of the second aspect, after determining whether an RRU providing a service to the UE exists in the first paired RRU set, the processor is further configured to: when an RRU providing a service to the UE does not exist in the first paired RRU set, determine that the actual user attribute of the UE is the initial user attribute.

With reference to the second aspect, in a fourth possible implementation manner of the second aspect, when determining the second paired RRU set of the UE according to the first paired RRU set and the paired UE set, the processor is specifically configured to: determine a priority of each UE according to a service type of each UE in the paired UE set; perform correlation calculation on each paired UE in the paired UE set and the UE; sequentially determine, according to the priorities in descending order, whether each paired UE has a correlation with the UE; when paired UE having the highest priority has a correlation with the UE, acquire a working RRU of the paired UE having the highest priority, and delete the working RRU of the paired UE having the highest priority from the first paired RRU set, to obtain the second paired RRU set; and when the paired UE having the highest priority does not have a correlation with the UE, sequentially determine, according to the priorities in descending order, whether rest paired UEs in the paired UE set have a correlation with the UE; and when paired UE having a correlation with the UE exists in the rest paired UEs in the paired UE set, process the paired UE having a correlation with the UE in a manner of processing the paired UE having the highest priority to obtain the second paired RRU set.

With reference to the fourth possible implementation manner of the second aspect, in a fifth possible implementation manner of the second aspect, after sequentially determining, according to the priorities in descending order, whether the rest paired UEs in the paired UE set have a correlation with the UE, the processor is further configured to: when UE having a correlation with the UE does not exist in the rest paired UEs in the paired UE set, determine that the actual user attribute of the UE is the initial user attribute.

With reference to the second aspect, in a sixth possible implementation manner of the second aspect, when determining the actual user attribute of the UE according to the second paired RRU set and the initial user attribute of the UE, the processor is specifically configured to: when an RRU providing a service to the UE does not exist in the second paired RRU set, determine the actual user attribute of the UE according to the initial user attribute of the UE; and when an RRU providing a service to the UE exists in the second paired RRU set, according to priorities in descending order, re-determine a new second paired RRU set according to rest paired UEs in the paired UE set and the first paired RRU set, until an RRU providing a service to the UE does not exist in the new second paired RRU set.

With reference to the sixth possible implementation manner of the second aspect, in a seventh possible implementation manner of the second aspect, the user attribute is an all joint-scheduling user, a partial joint-scheduling user, or an independent-scheduling user; and when determining the actual user attribute of the UE according to the initial user attribute of the UE, the processor is specifically configured to: when the initial user attribute of the UE is an all joint-scheduling user, determine that the actual user attribute of the UE is a partial joint-scheduling user; and when the initial user attribute of the UE is a partial joint-scheduling user, determine that the actual user attribute of the UE is an independent-scheduling user.

With reference to the seventh possible implementation manner of the second aspect, in an eighth possible implementation manner of the second aspect, after determining the actual user attribute of the UE according to the initial user attribute of the UE, the processor is further configured to: when the UE is a BF user, perform weighted processing on a beam direction of the UE.

According to a third aspect, a resource scheduling method is provided, where the method includes: acquiring an RRU set of UE; determining an RRU having the highest signal strength of the UE according to an RSRP at which the UE arrives at each RRU in the working RRU set; screening the working RRU set based on the RRU having the highest signal strength, to generate a first paired RRU set of the UE; generating a paired UE set based on the first paired RRU set; determining whether an RRU providing a service to the UE exists in the first paired RRU set; when an RRU providing a service to the UE exists in the first paired RRU set, determining a second paired RRU set of the UE according to the first paired RRU set and the paired UE set; determining an actual user attribute of the UE according to the second paired RRU set and an initial user attribute of the UE; and scheduling a resource for the UE according to the actual user attribute of the UE.

With reference to the third aspect, in a first possible implementation manner of the third aspect, the acquiring a working RRU set of UE includes: determining each RRU providing a service to the UE, to acquire the working RRU set formed by the RRUs; or determining, according to an isolation range of the UE, each RRU providing a service to the UE, to acquire the working RRU set formed by the RRUs.

With reference to the third aspect, in a second possible implementation manner of the third aspect, the generating a paired UE set based on the first paired RRU set includes: acquiring UE served by each RRU in the first paired RRU set, and forming the paired UE set by using the UEs served by the RRUs in the first paired RRU set; or acquiring UE served by each RRU in the first paired RRU set, screening out a BF user from the UE served by each RRU, and forming the paired UE set by using the BF users screened out.

With reference to the third aspect, in a third possible implementation manner of the third aspect, after the determining whether an RRU providing a service to the UE exists in the first paired RRU set, the method further includes: when an RRU providing a service to the UE does not exist in the first paired RRU set, determining that the actual user attribute of the UE is the initial user attribute.

With reference to the third aspect, in a fourth possible implementation manner of the third aspect, the determining a second paired RRU set of the UE according to the first paired RRU set and the paired UE set includes: determining a priority of each UE according to a service type of each UE in the paired UE set; performing correlation calculation on each paired UE in the paired UE set and the UE; sequentially determining, according to the priorities in descending order, whether each paired UE has a correlation with the UE; if paired UE having the highest priority has a correlation with the UE, acquiring a working RRU of the paired UE having the highest priority, and deleting the working RRU of the paired UE having the highest priority from the first paired RRU set, to obtain the second paired RRU set; and if the paired UE having the highest priority does not have a correlation with the UE, sequentially determining, according to the priorities in descending order, whether rest paired UEs in the paired UE set have a correlation with the UE, and if paired UE having a correlation with the UE exists in the rest paired UEs in the paired UE set, processing the paired UE having a correlation with the UE in a manner of processing the paired UE having the highest priority to obtain the second paired RRU set.

With reference to the fourth possible implementation manner of the third aspect, in a fifth possible implementation manner of the third aspect, after the sequentially determining, according to the priorities in descending order, whether the rest paired UEs in the paired UE set have a correlation with the UE, the method further includes: if UE having a correlation with the UE does not exist in the rest paired UEs in the paired UE set, determining that the actual user attribute of the UE is the initial user attribute.

With reference to the third aspect, in a sixth possible implementation manner of the third aspect, the determining an actual user attribute of the UE according to the second paired RRU set and an initial user attribute of the UE includes: if an RRU providing a service to the UE does not exist in the second paired RRU set, determining the actual user attribute of the UE according to the initial user attribute of the UE; and if an RRU providing a service to the UE exists in the second paired RRU set, according to priorities in descending order, re-determining a new second paired RRU set according to rest paired UEs in the paired UE set and the first paired RRU set, until an RRU providing a service to the UE does not exist in the new second paired RRU set.

With reference to the sixth possible implementation manner of the third aspect, in a seventh possible implementation manner of the third aspect, the user attribute is an all joint-scheduling user, a partial joint-scheduling user, or an independent-scheduling user; and the determining the actual user attribute of the UE according to the initial user attribute of the UE includes: if the initial user attribute of the UE is an all joint-scheduling user, determining that the actual user attribute of the UE is a partial joint-scheduling user; and if the initial user attribute of the UE is a partial joint-scheduling user, determining that the actual user attribute of the UE is an independent-scheduling user.

With reference to the seventh possible implementation manner of the third aspect, in an eighth possible implementation manner of the third aspect, after the determining the actual user attribute of the UE according to the initial user attribute of the UE, the method further includes: if the UE is a BF user, performing weighted processing on a beam direction of the UE.

The technical solutions provided in the embodiments of the present invention bring the following advantageous effects:

An RRU having the highest signal strength of UE is determined, and a working RRU set is screened based on the RRU having the highest signal strength to obtain a first paired RRU set of the UE. Then a paired UE set is generated based on the first paired RRU set. When an RRU providing a service to the UE exists in the first paired RRU set, a second paired RRU set of the UE is determined according to the first paired RRU set and the paired UE set. Further, an actual user attribute of the UE is determined according to the second paired RRU set and an initial user attribute, so that a resource is scheduled for the UE according to the actual user attribute of the UE. Because the actual user attribute of the UE can reflect a status of interference between the UE and another UE, a resource is scheduled for the UE according to the actual user attribute of the UE, thereby not only reducing inter-cell interference, but also improving resource utilization efficiency.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present embodiments clearer, the following further describes the embodiments of the present invention in detail with reference to the accompanying drawings.

Figure 1:
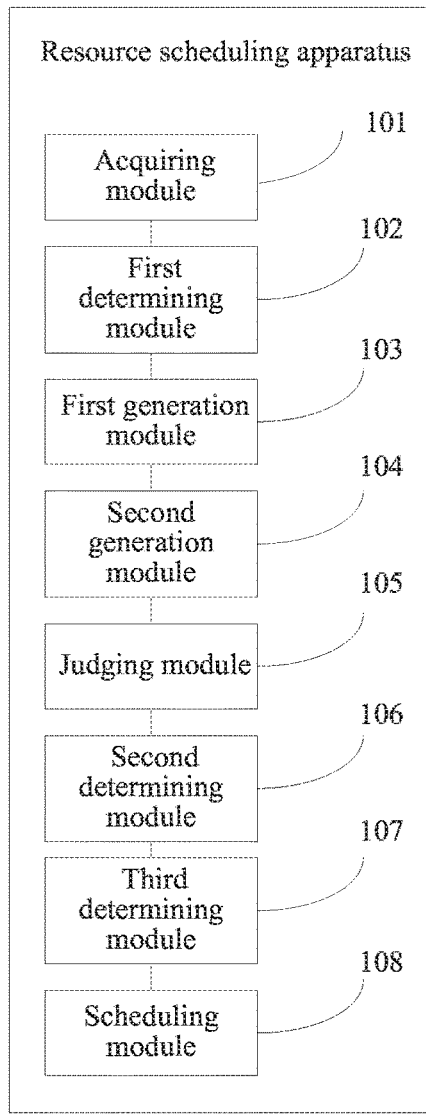
FIG. 1 is a schematic structural diagram of a resource scheduling apparatus according to an embodiment of the present invention.

In the communications field, to reduce inter-cell interference in a long term evolution (LTE) system, a multi-remote radio unit (RRU) cell technology is generally used to perform resource scheduling. Based on the multi-RRU cell technology, when resource scheduling is performed in the prior art, scheduling is performed mainly depending on a user attribute that is determined by using a condition for detecting a signal and interference intensity. As a result, resource utilization efficiency of a joint-scheduling user is not high, and interference between independent-scheduling users is relatively strong. To reduce interference, and improve resource usage, an embodiment of the present invention provides a resource scheduling apparatus. Referring to FIG. 1, the apparatus is configured to perform the following resource scheduling method in any one of embodiments in FIG. 3 to FIG. 7, and the apparatus includes: an acquiring module 101, configured to acquire an RRU set of a user equipment (UE); a first determining module 102, configured to determine an RRU having the highest signal strength of the UE according to an reference signal received power (RSRP) at which the UE arrives at each RRU in the working RRU set; a first generation module 103, configured to screen the working RRU set based on the RRU having the highest signal strength, to generate a first paired RRU set of the UE; a second generation module 104, configured to generate a paired UE set based on the first paired RRU set; a judging module 105, configured to determine whether an RRU providing a service to the UE exists in the first paired RRU set; a second determining module 106, configured to: when an RRU providing a service to the UE exists in the first paired RRU set, determine a second paired RRU set of the UE according to the first paired RRU set and the paired UE set; a third determining module 107, configured to determine an actual user attribute of the UE according to the second paired RRU set and an initial user attribute of the UE; and a scheduling module 108, configured to schedule a resource for the UE according to the actual user attribute of the UE.

Optionally, the acquiring module 101 is configured to: determine each RRU providing a service to the UE, to acquire the working RRU set formed by the RRUs, or determine, according to an isolation range of the UE, each RRU providing a service to the UE, to acquire the working RRU set formed by the RRUs.

Optionally, the second generation module 104 is configured to: acquire UE served by each RRU in the first paired RRU set, and form the paired UE set by using the UEs served by the RRUs in the first paired RRU set, or acquire UE served by each RRU in the first paired RRU set, screen out a beamforming BF user from the UE served by each RRU, and form a paired UE set by using the BF users screened out.

Optionally, the apparatus further includes: a fourth determining module, configured to: when an RRU providing a service to the UE does not exist in the first paired RRU set, determine that the actual user attribute of the UE is the initial user attribute.

Optionally, the second determining module 106 includes: a first determining unit, configured to determine a priority of each UE according to a service type of each UE in the paired UE set; a calculation unit, configured to perform correlation calculation on each paired UE in the paired UE set and the UE; a judging unit, configured to sequentially determine, according to the priorities in descending order, whether each paired UE has a correlation with the UE; a first processing unit, configured to: when paired UE having the highest priority has a correlation with the UE, acquire a working RRU of the paired UE having the highest priority, and delete the working RRU of the paired UE having the highest priority from the first paired RRU set, to obtain the second paired RRU set; and a second processing unit, configured to: when the paired UE having the highest priority does not have a correlation with the UE, sequentially determine, according to the priorities in descending order, whether rest paired UEs in the first paired RRU set have a correlation with the UE, and when paired UE having a correlation with the UE exists in the rest paired UEs in the first paired RRU set, process the paired UE having a correlation with the UE in a manner of processing the paired UE having the highest priority to obtain the second paired RRU set.

Optionally, the apparatus further includes: a fifth determining module, configured to: when UE having a correlation with the UE does not exist in the rest paired UEs, determine that the actual user attribute of the UE is the initial user attribute.

Optionally, the third determining module 107 includes: a first determining unit, configured to: when an RRU providing a service to the UE does not exist in the second paired RRU set, determine the actual user attribute of the UE according to the initial user attribute of the UE; and a second determining unit, configured to: when an RRU providing a service to the UE exists in the second paired RRU set, according to priorities in descending order, re-determine a new second paired RRU set according to rest paired UEs in the first paired set and the first paired RRU set, until an RRU providing a service to the UE does not exist in the new second paired RRU set.

Optionally, the user attribute is an all joint-scheduling user, a partial joint-scheduling user, or an independent-scheduling user; and the first determining unit includes: a first determining subunit, configured to: when the initial user attribute of the UE is an all joint-scheduling user, determine that the actual user attribute of the UE is a partial joint-scheduling user; and a second determining subunit, configured to: when the initial user attribute of the UE is a partial joint-scheduling user, determine that the actual user attribute of the UE is an independent-scheduling user.

Optionally, the apparatus further includes: a processing module, configured to: when the UE is a BF user, perform weighted processing on a beam direction of the UE.

To sum up, the apparatus provided in this embodiment of the present invention determines an RRU having the highest signal strength of UE, screens a working RRU set based on the RRU having the highest signal strength, to obtain a first paired RRU set of the UE; then generates a paired UE set based on the first paired RRU set, and when an RRU providing a service to the UE exists in the first paired RRU set, determines a second paired RRU set of the UE according to the first paired RRU set and the paired UE set; and further, determines an actual user attribute of the UE according to the second paired RRU set and an initial user attribute, so that a resource is scheduled for the UE according to the actual user attribute of the UE. Because the actual user attribute of the UE can reflect a status of interference between the UE and another UE, a resource is scheduled for the UE according to the actual user attribute of the UE, thereby not only reducing inter-cell interference, but also improving resource utilization efficiency.

Figure 2:
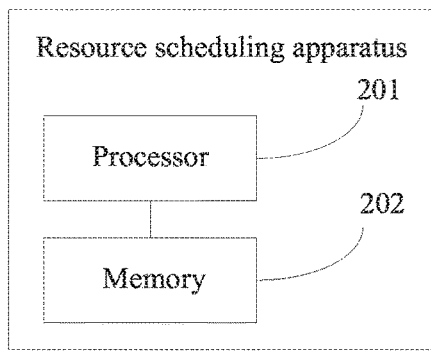
FIG. 2 is a schematic structural diagram of a resource scheduling apparatus according to another embodiment of the present invention.

FIG. 2 shows a resource scheduling apparatus according to an embodiment of the present invention, and the apparatus includes: a processor 201; and a memory 202, configured to store an instruction that can be executed by the processor 201, where the processor 201 is configured to: acquire a working RRU set of UE; determine an RRU having the highest signal strength of the UE according to an RSRP at which the UE arrives at each RRU in the working RRU set; screen the working RRU set based on the RRU having the highest signal strength, to generate a first paired RRU set of the UE; generate a paired UE set based on the first paired RRU set; determine whether an RRU providing a service to the UE exists in the first paired RRU set; when an RRU providing a service to the UE exists in the first paired RRU set, determine a second paired RRU set of the UE according to the first paired RRU set and the paired UE set; determine an actual user attribute of the UE according to the second paired RRU set and an initial user attribute of the UE; and schedule a resource for the UE according to the actual user attribute of the UE.

Optionally, when acquiring the working RRU set of the UE, the processor 201 is specifically configured to: determine each RRU providing a service to the UE, to acquire the working RRU set formed by the RRUs; or when acquiring the working RRU set of the UE, the processor 201 is specifically configured to: determine, according to an isolation range of the UE, each RRU providing a service to the UE, to acquire the working RRU set formed by the RRUs.

Optionally, when generating the paired UE set based on the first paired RRU set, the processor 201 is specifically configured to: acquire UE served by each RRU in the first paired RRU set, and form the paired UE set by using the UEs served by the RRUs in the first paired RRU set; or when generating the paired UE set based on first paired RRU set, the processor 201 is specifically configured to: acquire UE served by each RRU in the first paired RRU set, screen out a BF user from the UE to which each RRU provides a service, and form the paired UE set by using the BF users screened out.

Optionally, after determining whether an RRU providing a service to the UE exists in the first paired RRU set, the processor 201 is further configured to: when an RRU providing a service to the UE does not exist in the first paired RRU set, determine that the actual user attribute of the UE is the initial user attribute.

Optionally, when determining the second paired RRU set of the UE according to the first paired RRU set and the paired UE set, the processor 201 is specifically configured to: determine a priority of each UE according to a service type of each UE in the paired UE set; perform correlation calculation on each paired UE in the paired UE set and the UE; sequentially determine, according to the priorities in descending order, whether each paired UE has a correlation with the UE; when paired UE having the highest priority has a correlation with the UE, acquire a working RRU of the paired UE having the highest priority, and delete the working RRU of the paired UE having the highest priority from the first paired RRU set, to obtain the second paired RRU set; and when the paired UE having the highest priority does not have a correlation with the UE, sequentially determine, according to the priorities in descending order, whether rest paired UEs in the first paired RRU set have a correlation with the UE; and when paired UE having a correlation with the UE exists in the rest paired UEs in the first paired RRU set, process the paired UE having a correlation with the UE in a manner of processing the paired UE having the highest priority to obtain the second paired RRU set.

Optionally, after sequentially determining, according to the priorities in descending order, whether the rest paired UEs have a correlation with the UE, the processor 201 is further configured to: when UE having a correlation with the UE does not exist in the rest paired UEs in the paired UE set, determine that the actual user attribute of the UE is the initial user attribute.

Optionally, when determining the actual user attribute of the UE according to the second paired RRU set and the initial user attribute of the UE, the processor 201 is specifically configured to: when an RRU providing a service to the UE does not exist in the second paired RRU set, determine the actual user attribute of the UE according to the initial user attribute of the UE; and when an RRU providing a service to the UE exists in the second paired RRU set, according to priorities in descending order, re-determine a new second paired RRU according to rest paired UEs in the first paired set and the first paired RRU, until an RRU providing a service to the UE does not exist in the new second paired RRU set.

Optionally, the user attribute is an all joint-scheduling user, a partial joint-scheduling user, or an independent-scheduling user; and when determining the actual user attribute of the UE according to the initial user attribute of the UE, the processor 201 is specifically configured to: when the initial user attribute of the UE is an all joint-scheduling user, determine that the actual user attribute of the UE is a partial joint-scheduling user; and when the initial user attribute of the UE is a partial joint-scheduling user, determine that the actual user attribute of the UE is an independent-scheduling user.

Optionally, after determining the actual user attribute of the UE according to the initial user attribute of the UE, the processor 201 is further configured to: when the UE is a BF user, perform weighted processing on a beam direction of the UE.

The apparatus provided in this embodiment of the present invention determines an RRU having the highest signal strength of UE, screens a working RRU set based on the RRU having the highest signal strength, to obtain a first paired RRU set of the UE; then generates a paired UE set based on the first paired RRU set, and when an RRU providing a service to the UE exists in the first paired RRU set, determines a second paired RRU set of the UE according to the first paired RRU set and the paired UE set; and further, determines an actual user attribute of the UE according to the second paired RRU set and an initial user attribute, so that a resource is scheduled for the UE according to the actual user attribute of the UE. Because the actual user attribute of the UE can reflect a status of interference between the UE and another UE, a resource is scheduled for the UE according to the actual user attribute of the UE, thereby not only reducing inter-cell interference, but also improving resource utilization efficiency.

Figure 3:
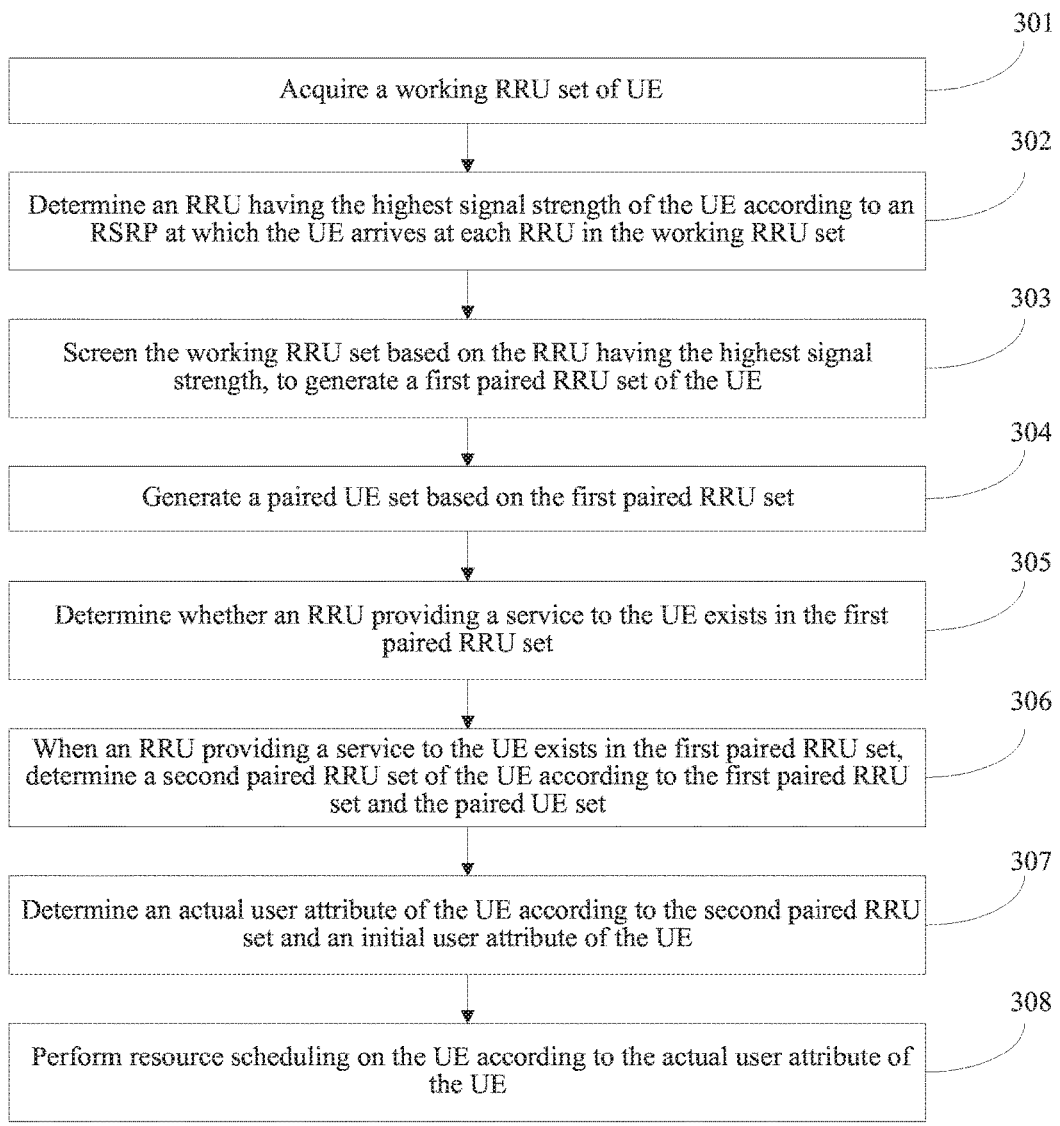
FIG. 3 is a flowchart of a resource scheduling method according to another embodiment of the present invention.

An embodiment of the present invention provides a resource scheduling method. Referring to FIG. 3, a procedure of the method provided in this embodiment includes:

301: Acquire a working RRU set of UE.

302: Determine an RRU having the highest signal strength of the UE according to an RSRP at which the UE arrives at each RRU in the working RRU set.

303: Screen the working RRU set based on the RRU having the highest signal strength, to generate a first paired RRU set of the UE.

304: Generate a paired UE set based on the first paired RRU set.

305: Determine whether an RRU providing a service to the UE exists in the first paired RRU set.

306: When an RRU providing a service to the UE exists in the first paired RRU set, determine a second paired RRU set of the UE according to the first paired RRU set and the paired UE set.

307: Determine an actual user attribute of the UE according to the second paired RRU set and an initial user attribute of the UE.

308: Schedule a resource for the UE according to the actual user attribute of the UE.

According to the method provided in this embodiment of the present invention, an RRU having the highest signal strength of UE is determined, and a working RRU set is screened based on the RRU having the highest signal strength, to obtain a first paired RRU set of the UE. Then a paired UE set is generated based on the first paired RRU set, and when an RRU providing a service to the UE exists in the first paired RRU set, a second paired RRU set of the UE is determined according to the first paired RRU set and the paired UE set. Further, an actual user attribute of the UE is determined according to the second paired RRU set and an initial user attribute, so that a resource is scheduled for the UE according to the actual user attribute of the UE. Because the actual user attribute of the UE can reflect a status of interference between the UE and another UE, a resource is scheduled for the UE according to the actual user attribute of the UE, thereby not only reducing inter-cell interference, but also improving resource utilization efficiency.

Optionally, the acquiring a working RRU set of UE includes: determining each RRU providing a service to the UE, to acquire the working RRU set formed by the RRUs; or determining, according to an isolation range of the UE, each RRU providing a service to the UE, to acquire the working RRU set formed by the RRUs.

Optionally, the generating a paired UE set based on the first paired RRU set includes: acquiring UE served by each RRU in the first paired RRU set, and forming the paired UE set by using the UEs served by the RRUs in the first paired RRU set; or acquiring UE served by each RRU in the first paired RRU set, screening out a BF user from the UE served by each RRU, and forming the paired UE set by using the BF users screened out.

Optionally, after the determining whether an RRU providing a service to the UE exists in the first paired RRU set, the method further includes: when an RRU providing a service to the UE does not exist in the first paired RRU set, determining that the actual user attribute of the UE is the initial user attribute.

Optionally, the determining a second paired RRU set of the UE according to the first paired RRU set and the paired UE set includes: determining a priority of each UE according to a service type of each UE in the paired UE set; performing correlation calculation on each paired UE in the paired UE set and the UE; sequentially determining, according to the priorities in descending order, whether each paired UE has a correlation with the UE; if paired UE having the highest priority has a correlation with the UE, acquiring a working RRU of the paired UE having the highest priority, and deleting the working RRU of the paired UE having the highest priority from the first paired RRU set, to obtain the second paired RRU set; and if the paired UE having the highest priority does not have a correlation with the UE, sequentially determining, according to the priorities in descending order, whether rest paired UEs in the first paired set have a correlation with the UE, and if paired UE having a correlation with the UE exists in the rest paired UEs in the first paired set, processing the paired UE having a correlation with the UE in a manner of processing the paired UE having the highest priority to obtain the second paired RRU set.

Optionally, after the sequentially determining, according to the priorities in descending order, whether the rest paired UEs have a correlation with the UE, the method further includes: if UE having a correlation with the UE does not exist in the rest paired UEs, determining that the actual user attribute of the UE is the initial user attribute.

Optionally, the determining an actual user attribute of the UE according to the second paired RRU set and an initial user attribute of the UE includes: if an RRU providing a service to the UE does not exist in the second paired RRU set, determining the actual user attribute of the UE according to the initial user attribute of the UE; and if an RRU providing a service to the UE exists in the second paired RRU set, according to the priorities in descending order, re-determining a new second paired RRU according to rest paired UEs and the first paired RRU, until an RRU providing a service to the UE does not exist in the new second paired RRU set.

Optionally, the user attribute is an all joint-scheduling user, a partial joint-scheduling user, or an independent-scheduling user; and the determining the actual user attribute of the UE according to the initial user attribute of the UE includes: if the initial user attribute of the UE is an all joint-scheduling user, determining that the actual user attribute of the UE is a partial joint-scheduling user; and if the initial user attribute of the UE is a partial joint-scheduling user, determining that the actual user attribute of the UE is an independent-scheduling user.

Optionally, after the determining the actual user attribute of the UE according to the initial user attribute of the UE, the method further includes: if the UE is a beamforming (BF) user, performing weighted processing on a beam direction of the UE.

All the foregoing optional technical solutions can be randomly combined to form optional embodiments of the present invention, which are not described in detail one by one herein.

Figure 4:
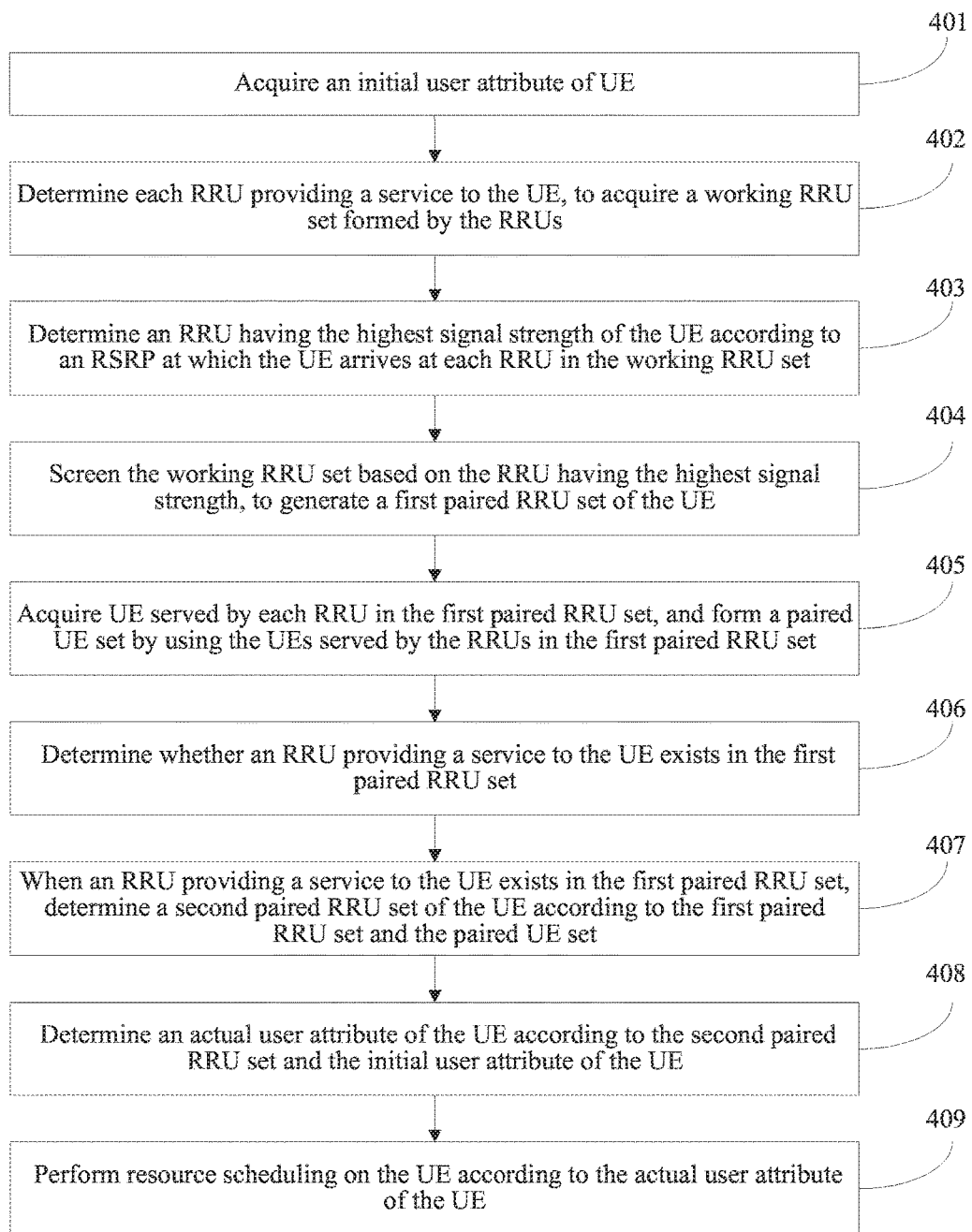
FIG. 4 is a flowchart of a resource scheduling method according to another embodiment of the present invention.

With reference to the embodiment shown in FIG. 3, an embodiment of the present invention provides a resource scheduling method. For example, resource scheduling is performed on current to-be-scheduled UE. Referring to FIG. 4, a procedure of the method provided in this embodiment includes.

401: Acquire an initial user attribute of UE.

The initial user attribute can reflect a status of interference between the current to-be-scheduled UE and another UE, which is important reference for scheduling a resource for the current to-be-scheduled UE, and therefore, before resource scheduling is performed by using the method provided in this embodiment, an initial user attribute of the current to-be-scheduled UE needs to be first acquired. The initial user attribute is an all joint-scheduling user, a partial joint-scheduling user, an independent-scheduling user, or the like, and the initial user attribute is not specifically limited in this embodiment.

To reduce inter-cell interference in an LTE system, multiple independent RRUs are generally combined into a logical cell. Determining the initial user attribute of the UE based on the logical cell formed by the multiple RRUs includes, but is not limited to, determining a user attribute of each UE according to a quantity of RRUs providing a service to each UE. Specifically, when all the RRUs in the logical cell formed by the multiple RRUs provide a service to the UE, it is determined that the initial user attribute of the UE is an all joint-scheduling user; when some RRUs in the logical cell formed by the multiple RRUs provide a service to the UE, it is determined that the initial user attribute of the UE is a partial joint-scheduling user; when one RRU in the logical cell formed by the multiple RRUs provides a service to the UE, it is determined that the initial user attribute of the UE is an independent-scheduling user.

A manner of determining the quantity of RRUs providing a service to each UE includes, but is not limited to, the following manner: acquiring location information of the UE, and determining, according to the location information of the UE, the quantity of RRUs providing a service to the UE. Specifically, if a distance between the UE and each RRU is less than a first preset distance, it is determined that all the RRUs provide a service to the UE, and in this case, the initial user attribute of the UE is an all joint-scheduling user; if distances between the UE and some RRUs are less than a first preset distance, it is determined that some RRUs provide a service to the UE, and in this case, the initial user attribute of the UE is a partial joint-scheduling user; if a distance between the UE and one RRU is less than a first preset distance, it is determined that one RRU provides a service to the UE, and in this case, the initial user attribute of the UE is an independent joint-scheduling user. The first preset distance may be 30 meters, 50 meters, or the like, and the first preset distance is not specifically limited in this embodiment.

In addition, besides using the foregoing manner to determine the quantity of RRUs providing a service to each UE, the initial user attribute may also be determined according to interference intensity information. When interference intensity between the UE and each RRU is greater than a first preset threshold, it is determined that all the RRUs provide a service to the UE, and in this case, the initial user attribute of the UE is an all joint-scheduling user; when interference intensity between the UE and some RRUs is greater than a first preset threshold, it is determined that some RRUs provide a service to the UE, and in this case, the initial user attribute of the UE is a partial joint-scheduling user; when interference intensity between the UE and one RRU is greater than a first preset threshold, it is determined that one RRU provides a service to the UE, and in this case, the initial user attribute of the UE is an independent joint-scheduling user. The first preset threshold may be 1, 2, 3, or the like, and the first preset threshold is not specifically limited in this embodiment.

For ease of understanding of the foregoing process, a detailed description is made below by using a specific example.

Figure 5:
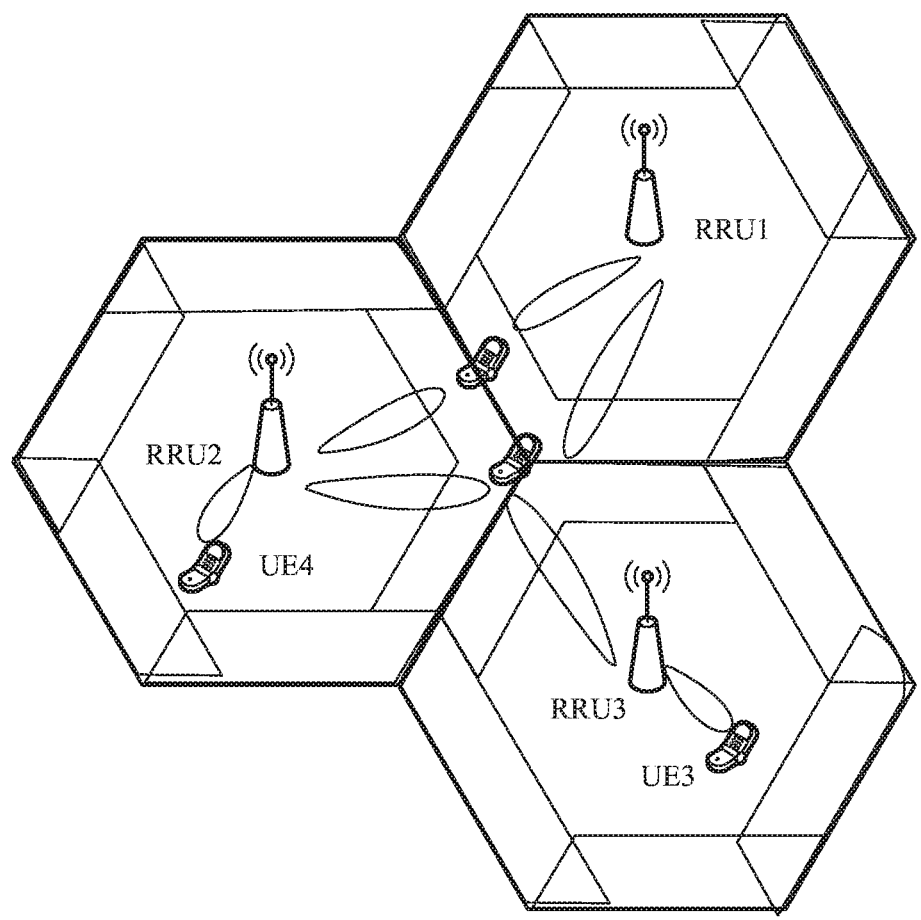
FIG. 5 is schematic diagram of a multi-RRU cell according to another embodiment of the present invention.

FIG. 5 is a schematic diagram of a logical cell formed by multiple RRUs. It can be known from FIG. 5 that, the logical cell includes three RRUs, which are respectively an RRU1, an RRU2, and an RRU3, and the logical cell includes four UEs, which are respectively UE1, UE2, UE3, and UE4. If RRUs providing a service to the UE1 are the RRU1 and the RRU2, RRUs providing a service to the UE2 are the RRU1, the RRU2, and the RRU3, an RRU providing a service to the UE3 is the RRU1, and an RRU providing a service to the UE4 is the RRU2, it is determined that the UE1 is a partial joint-scheduling user, the UE2 is an all joint-scheduling user, the UE3 is an independent-scheduling user, and the UE4 is an independent-scheduling user.

402: Determine each RRU providing a service to the UE, to acquire a working RRU set formed by the RRUs.

Because locations and signal conditions of UEs are different, RRUs providing a service to the UEs in the logical cell are also different. If a distance between the UE and each RRU in the logical cell is less than a second preset distance, and interference between all the RRUs is relatively severe, all the RRUs are used as serving RRUs of the UE, and a set formed by all the RRUs is used as the working RRU set of the UE; if distances between the UE and some RRUs in the logical cell are less than a second preset distance, and interference between these RRUs and another RRU is relatively severe, these RRUs are used as serving RRUs of the UE, and a set formed by these RRUs are used as the working RRU set of the UE; if a distance between the UE and one RRU in the logical cell is less than a second preset distance, and interference between the RRU and another RRU is not severe, the RRU is used as a serving RRU of the UE, and a set formed by the RRU is used as the working RRU set of the UE. The second preset distance may be 10 meters, 20 meters, 50 meters, or the like, and the second preset distance is not specifically limited in this embodiment.

403: Determine an RRU having the highest signal strength of the UE according to an RSRP at which the UE arrives at each RRU in the working RRU set.

An RSRP in an LTE network may represent a key parameter of radio signal strength and one of physical layer measurement requirements, and is an average value of powers of signals received on all REs (resource element) in which a specific symbol carries a reference signal. The unit of the RSRP is dbm. In this embodiment, the RRU having the highest signal strength is an RRU in which the UE receives the strongest signal.

A manner of determining the RRU having the highest signal strength of the UE according to the RSRP at which the UE arrives at each RRU in the working RRU set includes, but is not limited to, first, receiving a test report that is sent by the UE and that carries the RSRP at which the UE arrives at each RRU in the working RRU set; and then, using an RRU that has the highest RSRP of the RSRP at which the UE arrives in the working RRU set is used as the RRU having the highest signal strength.

For the foregoing process, for ease of understanding, a detailed description is made below by using a specific example.

For example, it is set in such a manner that a working RRU set of any UE includes four RRUs, which are respectively an RRU1, an RRU2, an RRU3, and an RRU4. If an RSRP at which the UE arrives at the RRU1 is 3 dbm, an RSRP at which the UE arrives at the RRU2 is 6 dbm, an RSRP at which the UE arrives at the RRU3 is 2 dbm, and an RSRP at which the UE arrives at the RRU4 is 7 dbm, it is determined that the RRU having the highest signal strength of the UE is the RRU4.

404: Screen the working RRU set based on the RRU having the highest signal strength, to generate a first paired RRU set of the UE.

After the RRU having the highest signal strength is obtained, according to the method provided in this embodiment, the working RRU set is further screened based on the RRU having the highest signal strength, to generate the first paired RRU set.

The screening the working RRU set based on the RRU having the highest signal strength, to generate a first paired RRU set of the UE includes, but is not limited to, deleting the RRU having the highest signal strength from the working RRU set, and forming the first paired RRU set by using rest RRUs in the working RRU set. For example, it is set in such a manner that a working RRU set of any UE includes four RRUs, which are respectively an RRU1, an RRU2, an RRU3, and an RRU4. The RRU1 is the RRU having the highest signal strength of the UE, and after the RRU1 is deleted from the working RRU set of the UE, the first paired RRU set is formed by using rest RRUs in the working RRU set: the RRU2, the RRU3, and the RRU4.

405: Acquire UE served by each RRU in the first paired RRU set, and form a paired UE set by using the UEs served by the RRUs in the first paired RRU set.

According to the resource scheduling method provided in this embodiment, when resource scheduling is performed on current to-be-scheduled UE, paired UE that may be paired is mainly found from a paired UE set for the current to-be-scheduled UE, and then an initial user attribute of the current to-be-scheduled UE is changed, to implement resource scheduling for the UE, reduce inter-cell interference, and improve resource utilization efficiency. Therefore, before resource scheduling is performed, the paired UE set needs to be determined by using the method provided in this embodiment.

When the paired UE set is determined, each RRU in the first paired RRU set may be first acquired, then the UE served by each RRU is acquired, and further, the paired UE set is generated according to the UE to which each RRU provides a service, where the paired UE set includes the UE to which each RRU provides a service. For example, the first paired RRU set includes the RRU1, the RRU2, and the RRU3, where UEs to which the RRU1 provides a service are the UE1 and the UE2, UE to which the RRU2 provides a service is the UE3, and UEs to which the RRU3 provides a service are the UE1 and the UE4. The paired UE set may be obtained according to the UE to which each RRU provides a service, so that the paired UE set includes the UE1, the UE2, the UE3, and the UE4.

406: Determine whether an RRU providing a service to the UE exists in the first paired RRU set, and if yes, perform step 407.

In this embodiment, whether an RRU providing a service to the UE exists in the first paired RRU set determines whether paired UE paired with the UE can be found from the paired UE set. When an RRU providing a service to the UE exists in the first paired RRU set, it indicates that paired UE paired with the UE can be found from the paired UE set, only this case is used as an example for description in this embodiment of the present invention, and for details, reference may be made to subsequent step 407 to step 409. In another embodiment of the present invention, when an RRU providing a service to the UE does not exist in the first paired RRU set, it indicates that paired UE paired with the UE cannot be found from the paired UE set, and in this case, it is determined that an actual user attribute of the UE is an initial user, so that a resource is scheduled for the UE according to the initial user attribute of the UE.

407: Determine a second paired RRU set of the UE according to the first paired RRU set and the paired UE set.

Specifically, a manner of determining the second paired RRU set of the UE according to the first paired RRU set and the paired UE set includes, but is not limited to, the following steps.

A first step: Determine a priority of each UE according to a service type of each UE in the paired UE set.

A service type of UE is a low priority service, a high priority service, or the like, and the service type of the UE is not specifically limited in this embodiment. When the priority of each UE is determined according to the service type of each UE in the paired UE set, the UEs in the paired UE set are first sorted in descending order of service priorities of the UEs in the paired set, and then the priority of each UE is determined according to a sorting result. For example, the UEs included in the paired UE set are the UE1, the UE2, and the UE3, if a service type of the UE1 is a high priority, a service type of the UE2 is a low priority, and a service type of the UE3 is a relatively high priority, the UEs in the paired set are sorted according to the service priority of each UE in the paired UE set, and a sorting result: the UE1>the UE3>the UE2 may be obtained, so that it is determined, according to the sorting result, that an order of the priorities of the UEs in the paired UE set is: the UE1>the UE3>the UE2.

A second step: Perform correlation calculation on each paired UE in the paired UE set and the UE.

A manner of performing correlation calculation on each paired UE in the paired UE set and the UE includes, but is not limited to, performing calculation by using an orthogonal coefficient Orthval formula.

The orthogonal coefficient Orthval formula is:

$$\rho^2 = |(W_u)^H \cdot W_v|^2,$$

where $\rho^2$ is a correlation between a user u and a user v, $W_u$ is a weight vector of the user u, H is a transposed symbol, and $W_v$ is a weight vector of the user v.

A third step: Sequentially determine, according to the priorities in descending order, whether each paired UE has a correlation with the UE.

When it is sequentially determined, according to the priorities in descending order, whether each paired UE has a correlation with the UE, if a correlation $\rho^2$ between paired UE and the UE is greater than a second preset threshold, it is determined that the paired UE has a correlation with the UE, or if a correlation $\rho^2$ between paired UE and the UE is less than a second preset threshold, it is determined that the paired UE does not have a correlation with the UE. The second preset threshold may be 1, 2, 3, or the like, and the second preset threshold is not specifically limited in this embodiment.

A fourth step: If paired UE having the highest priority has a correlation with the UE, acquire a working RRU of the paired UE having the highest priority, and delete the working RRU of the paired UE having the highest priority from the first paired RRU set, to obtain the second paired RRU set.

When the paired UE having the highest priority has a correlation with the UE, it indicates that the paired UE having the highest priority and the UE can be successfully paired, and in this case, the working RRU of the paired UE having the highest priority may be acquired, and further, the working RRU of the paired UE having the highest priority is deleted from the first paired RRU set, and the second paired RUU set is formed by using rest RRUs in the first paired RRU set.

It should be noted that, when the working RRU of the paired UE having the highest priority is deleted from the first paired RRU set, only an RRU included in the first paired RRU set is deleted, and for an RRU that is not included in the first paired RRU set, deletion processing does not need to be performed.

In addition, if the paired UE having the highest priority does not have a correlation with the UE, in this case, whether paired UE having the second highest priority has a correlation with the UE may be calculated. If the paired UE having the second highest priority has a correlation with the UE, a working RRU of the paired UE having the second highest priority is acquired, the working RRU of the paired UE having the second highest priority is deleted from the first paired RRU, and the second paired RRU set is formed by using rest RRUs in the first paired RRU set. If the paired UE having the second highest priority does not have a correlation with the UE, it is sequentially determined whether rest paired UEs have a correlation with the UE, and if paired UE having a correlation with the UE exists in the rest paired UEs, the paired UE having a correlation with the UE of the rest paired UEs is processed in a manner of processing the paired UE having the highest priority to obtain the second paired RRU set. In this process, if all UEs of the rest paired UEs are traversed, there is no paired UE having a correlation with the UE, it may be determined that the actual user attribute of the UE is the initial user attribute.

408: Determine an actual user attribute of the UE according to the second paired RRU set and the initial user attribute of the UE.

A manner of determining the actual user attribute of the UE according to the second paired RRU set and the initial user attribute of the UE includes, but is not limited to, the following two cases.

A first case: If an RRU providing a service to the UE does not exist in the second paired RRU set, the actual user attribute of the UE is determined according to the initial user attribute of the UE.

For the first case, when an RRU providing a service to the UE does not exist in the second paired RRU set, it indicates that paired UE having a correlation is paired successfully with the UE, and in this case, the actual user attribute of the UE is determined according to the initial user attribute of the UE. Specifically, if the initial user attribute of the UE is an all joint-scheduling user, it is determined that the actual user attribute of the UE is a partial joint-scheduling user; if the initial user attribute of the UE is a partial joint-scheduling user, it is determined that the actual user attribute of the UE is an independent-scheduling user.

After the actual user attribute of the UE is determined, according to the method provided in this embodiment, it is further determined whether the UE is a BF user, and if the UE is a BF user, weighted processing is performed on a beam direction of the UE. A manner of performing weighted processing on the beam direction of the UE includes, but is not limited to, adjusting a coefficient of the beam direction in each dimension, so that null forming (Null Forming) adjusted by the UE faces the paired UE.

A second case: If an RRU providing a service to the UE exists in the second paired RRU set, a new second paired set is determined, so as to determine the actual user attribute of the UE according to the new second paired set.

For the second case, when an RRU providing a service to the UE does not exist in the second paired RRU set, it indicates that paired UE having a correlation is not paired successfully with the UE, and in this case, according to the priorities in descending order, a new second paired RRU set is re-determined according to rest paired UEs and the first paired RRU set, until an RRU providing a service to the UE does not exist in the new second paired RRU set, and the UE can be paired successfully with the paired UE having a correlation. In this process, if all UEs of the rest paired UEs are traversed, the new second paired RRU set that can make pairing of the UE successful cannot be determined, and the initial user attribute of the UE is used as the actual user attribute of the UE.

409: Schedule a resource for the UE according to the actual user attribute of the UE.

After the actual user attribute of the UE is determined, a resource is scheduled for the UE based on the actual user attribute of the UE. When the actual user attribute of the UE is an independent-scheduling user, in this case, there is one RRU providing a service to the UE, and when the UE needs a resource, the RRU may schedule and send the resource for the UE; when the actual user attribute of the UE is a partial scheduling user, in this case, RRUs providing a service to the UE are some RRUs in a logical cell, and when the UE needs a resource, these RRUs may schedule and send the resource for the UE.

According to the method provided in this embodiment of the present invention, an RRU having the highest signal strength of UE is determined, a working RRU set is screened based on the RRU having the highest signal strength, to obtain a first paired RRU set of the UE, then a paired UE set is generated based on the first paired RRU set, when an RRU providing a service to the UE exists in the first paired RRU set, a second paired RRU set of the UE is determined according to the first paired RRU set and the paired UE set, and further, an actual user attribute of the UE is determined according to the second paired RRU set and an initial user attribute, so that a resource is scheduled for the UE according to the actual user attribute of the UE. Because the actual user attribute of the UE can reflect a status of interference between the UE and another UE, a resource is scheduled for the UE according to the actual user attribute of the UE, thereby not only reducing inter-cell interference, but also improving resource utilization efficiency.

Figure 6:
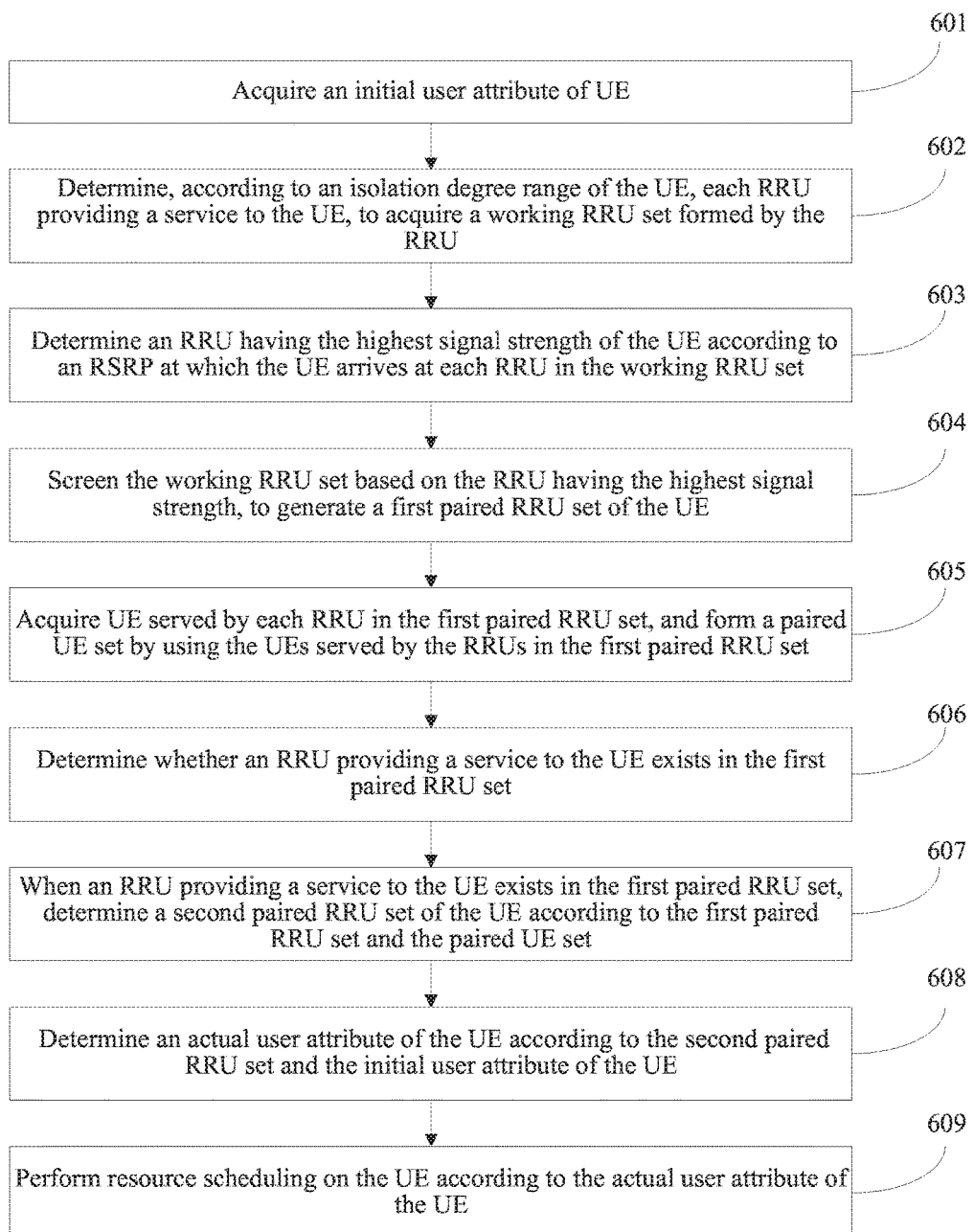
FIG. 6 is a flowchart of a resource scheduling method according to another embodiment of the present invention.

In the embodiment shown in FIG. 4, in the acquired working RRU set of the UE, all RRUs that can provide a service to the UE are used as elements in the working RRU set, and an RRU having relatively strong interference may exist in these RRUs, causing relatively strong inter-cell interference when resource scheduling is performed. To reduce inter-cell interference, an embodiment provides a resource scheduling method based on the embodiment shown in FIG. 4. Referring to FIG. 6, a procedure of the method provided in this embodiment includes.

601: Acquire an initial user attribute of UE.

A specific implementation manner of this step is the same as that of step 401, for details, refer to step 401, and details are not described herein again.

602: Determine, according to an isolation range of the UE, each RRU providing a service to the UE, to acquire a working RRU set formed by RRUs.

An isolation is a loss of a signal between an antenna port covered by a radio repeater and a donor antenna. Isolations may be classified into a vertical isolation and a horizontal isolation. The isolation is an important factor in a repeater application, and may reflect inter-cell interference.

To reduce inter-cell interference, and improve system resource utilization efficiency, in this embodiment, when the working RRU set of the UE is acquired, each RRU providing a service to the UE is further determined according to the isolation range of the UE, and the working RRU set is formed by using the RRUs providing a service to the UE, so as to acquire the working RRU set.

The determining, according to an isolation range of the UE, each RRU providing a service to the UE includes, but is not limited to, determining according to an isolation calculation formula. The isolation calculation formula is:

$$g = 10 \times \log 10 \left( \frac{\sum_{i_2=0}^{N_1-1} 10^{-0.1 \times D i_2}}{\sum_{i_1=N_1}^{M} 10^{-0.1 \times D i_1}} \right),$$

where g is the isolation, $N_1$ is an intermediate quantity, a value of $N_1$ is 0, 1, 2, . . . , or N−1, a value of $i_1$ is 0, 1, 2, . . . , or N−1, a value of $i_2$ is 0, 1, 2, . . . , or N−1, M is a quantity of cycles, M=N−1, N is a quantity of RRUs, and Di=RSRP[0]−RSRP[i], where i=$i_1$ or $i_2$. A specific calculation process is as follows.

(1) RSRPs at which the UE arrives at the RRUs are sorted in descending order, a sorted RSRP value is marked as an RSRP[i], and a sorted number is marked as the RSRP[i].

(2) A difference operation is performed on the RSRP[0] and the RSRP[i], to obtain Di.

(3) A value of Di is substituted into the isolation formula, to obtain an isolation at which the UE arrives at an RRU.

(4) The value of $N_1$ is increased progressively, and (1) to (3) are performed repeatedly N times, to obtain N isolations.

(5) The obtained N isolations are compared with a third preset threshold, and the working RRU set is formed by using an RRU corresponding to an isolation that is less than the third preset threshold. The third preset threshold may be 0, 1, 2, or the like, and the third preset threshold is not specifically limited in this embodiment.

603: Determine an RRU having the highest signal strength of the UE according to an RSRP at which the UE arrives at each RRU in the working RRU set.

A specific implementation manner of this step is the same as that of step 403, for details, refer to step 403, and details are not described herein again.

604: Screen the working RRU set based on the RRU having the highest signal strength, to generate a first paired RRU set of the UE.

A specific implementation manner of this step is the same as that of step 404, for details, refer to step 404, and details are not described herein again.

605: Acquire UE to which each RRU in the first paired RRU set provides a service, and form a paired UE set by using the UEs to which the RRUs in the first paired RRU set provide a service.

A specific implementation manner of this step is the same as that of step 405, for details, refer to step 405, and details are not described herein again.

606: Determine whether an RRU providing a service to the UE exists in the first paired RRU set.

A specific implementation manner of this step is the same as that of step 406, for details, refer to step 406, and details are not described herein again.

607: When an RRU providing a service to the UE exists in the first paired RRU set, determine a second paired RRU set of the UE according to the first paired RRU set and the paired UE set.

A specific implementation manner of this step is the same as that of step 407, for details, refer to step 407, and details are not described herein again.

608: Determine an actual user attribute of the UE according to the second paired RRU set.

A specific implementation manner of this step is the same as that of step 408, for details, refer to step 408, and details are not described herein again.

609: Schedule a resource for the UE according to the actual user attribute of the UE.

A specific implementation manner of this step is the same as that of step 409, for details, refer to step 409, and details are not described herein again.

According to the method provided in this embodiment of the present invention, an RRU having the highest signal strength of UE is determined, a working RRU set is screened based on the RRU having the highest signal strength, to obtain a first paired RRU set of the UE, then a paired UE set is generated based on the first paired RRU set, when an RRU providing a service to the UE exists in the first paired RRU set, a second paired RRU set of the UE is determined according to the first paired RRU set and the paired UE set, and further, an actual user attribute of the UE is determined according to the second paired RRU set and an initial user attribute of the UE, so that a resource is scheduled for the UE according to the actual user attribute of the UE. Because the actual user attribute of the UE can reflect a status of interference between the UE and another UE, a resource is scheduled for the UE according to the actual user attribute of the UE, thereby not only reducing inter-cell interference, but also improving resource utilization efficiency.

Figure 7:
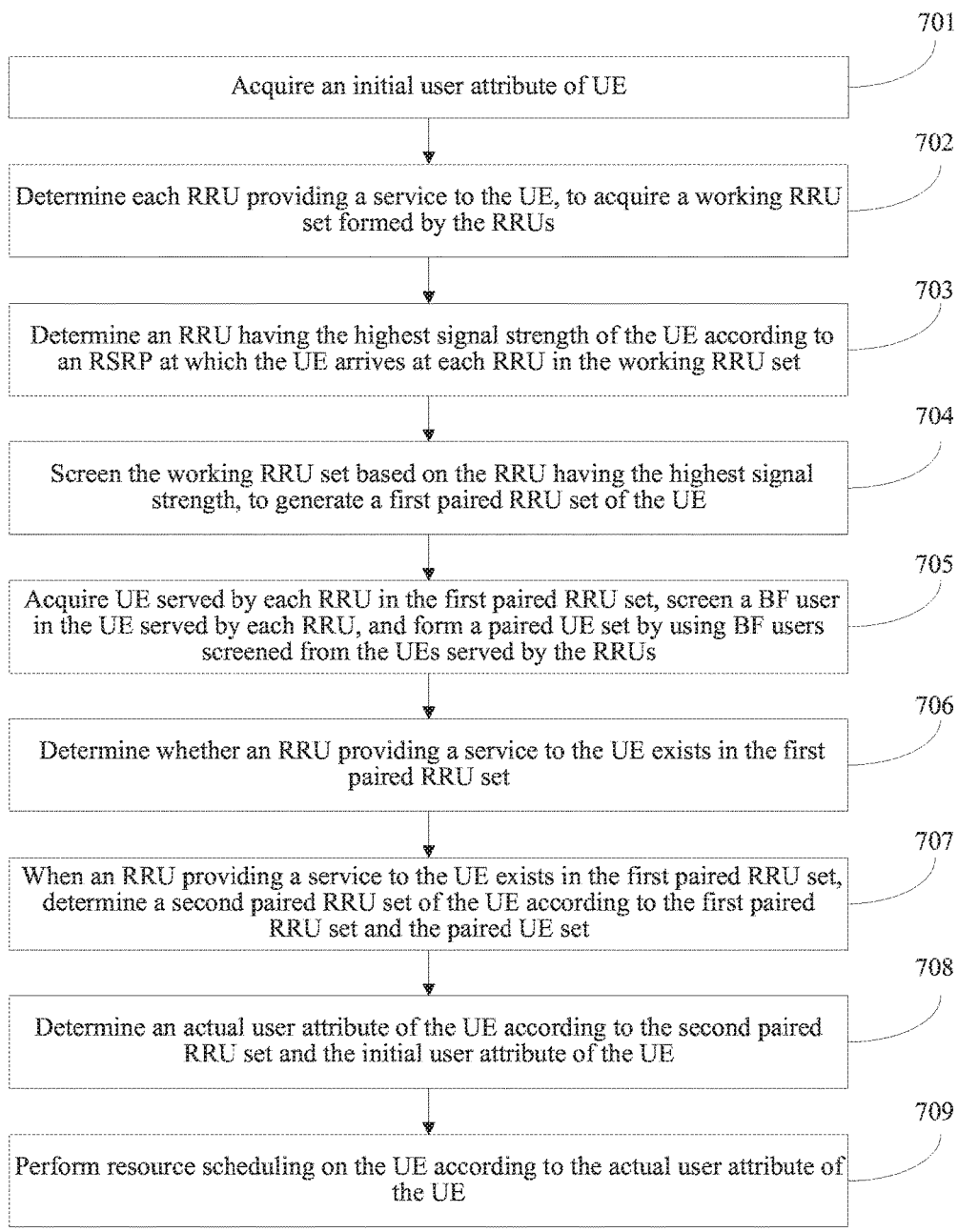
FIG. 7 is a flowchart of a resource scheduling method according to another embodiment of the present invention.

Because a beam direction of a BF user only faces the BF user, which has relatively small interference to another UE in a neighboring cell, in the embodiment shown in FIG. 4, in acquiring a paired UE set, all UEs served by the RRUs in the first paired RRU set are used as elements in the paired UE set, and these paired UEs may have relatively strong interference to currently scheduled UE, and therefore, to reduce inter-cell interference, an embodiment provides a resource scheduling based on the embodiment shown in FIG. 4. When a paired UE set is determined by using the resource scheduling method, UE served by each RRU in the first paired RRU set acquired in the embodiment shown in the FIG. 4 is screened, and the paired UE set is formed by using BF users screened out. Referring to FIG. 7, a procedure of the method provided in this embodiment includes.

701: Acquire an initial user attribute of UE.

A specific implementation manner of this step is the same as that of step 401, for details, refer to step 401, and details are not described herein again.

702: Determine, according to location information of the UE or interference intensity information, each RRU providing a service to the UE, to acquire a working RRU set formed by the RRUs.

A specific implementation manner of this step is the same as that of step 402, for details, refer to step 402, and details are not described herein again.

703: Determine an RRU having the highest signal strength of the UE according to an RSRP at which the UE arrives at each RRU in the working RRU set.

A specific implementation manner of this step is the same as that of step 403, for details, refer to step 403, and details are not described herein again.

704: Screen the working RRU set based on the RRU having the highest signal strength, to generate a first paired RRU set of the UE.

A specific implementation manner of this step is the same as that of step 404, for details, refer to step 404, and details are not described herein again.

705: Acquire UE to which each RRU in the first paired RRU set provides a service, screen out a BF user from the UE to which each RRU provides a service, and form a paired UE set by using the BF users screened out from the UEs to which the RRUs provide a service.

Because the first paired RRU set is already obtained in step 704, each RRU in the first paired RRU set is acquired in this step based on step 704, the UE served by each RRU is acquired, and further, the BF user is screened out from the UE to which each RRU provides a service, so as to obtain the paired UE set according to the BF users screened out, where the paired UE set includes the BF users to which the RRUs provide a service. For example, the first paired RRU set includes an RRU1, an RRU2, and an RRU3, where UEs to which the RRU1 provides a service are the UE1 and the UE2, UE to which the RRU2 provides a service is the UE3, and UEs to which the RRU3 provides a service are the UE1 and the UE4. If the UE1 and the UE3 are BF users, a set including the UE1 and the UE3 is used as the paired UE set.

706: Determine whether an RRU providing a service to the UE exists in the first paired RRU set.

A specific implementation manner of this step is the same as that of step 406, for details, refer to step 406, and details are not described herein again.

707: When an RRU providing a service to the UE exists in the first paired RRU set, determine a second paired RRU set of the UE according to the first paired RRU set and the paired UE set.

A specific implementation manner of this step is the same as that of step 407, for details, refer to step 407, and details are not described herein again.

708: Determine an actual user attribute of the UE according to the second paired RRU set.

A specific implementation manner of this step is the same as that of step 408, for details, refer to step 408, and details are not described herein again.

709: Schedule a resource for the UE according to the actual user attribute of the UE.

A specific implementation manner of this step is the same as that of step 409, for details, refer to step 409, and details are not described herein again.

According to the method provided in this embodiment of the present invention, an RRU having the highest signal strength of UE is determined, a working RRU set is screened based on the RRU having the highest signal strength, to obtain a first paired RRU set of the UE, then a paired UE set is generated based on the first paired RRU set, when an RRU providing a service to the UE exists in the first paired RRU set, a second paired RRU set of the UE is determined according to the first paired RRU set and the paired UE set, and further, an actual user attribute of the UE is determined according to the second paired RRU set and an initial user attribute, so that a resource is scheduled for the UE according to the actual user attribute of the UE. Because the actual user attribute of the UE can reflect a status of interference between the UE and another UE, a resource is scheduled for the UE according to the actual user attribute of the UE, thereby not only reducing inter-cell interference, but also improving resource utilization efficiency.

It should be noted that: when the resource scheduling apparatus provided in the foregoing embodiments performs resource scheduling, division of the foregoing functional modules is merely used as an example for description. In an actual application, the foregoing functions can be allocated to different functional modules and implemented according to a requirement, that is, the internal structure of the resource scheduling apparatus is divided into different function modules, so as to complete all or some of the functions described above. Besides, the resource scheduling apparatus provided in the foregoing embodiment belongs to the same concept as the embodiments of the resource scheduling method. For a specific implementation process thereof, refer to the method embodiments, and details are not described herein again.

A person of ordinary skill in the art may understand that all or some of the steps of the embodiments may be implemented by hardware or a program instructing relevant hardware. The program may be stored in a computer readable storage medium. The storage medium may include: a read-only memory, a magnetic disc, or an optical disc.

The foregoing descriptions are merely exemplary embodiments of the present invention, but are not intended to limit the present embodiments. Any modification, equivalent replacement, or improvement made without departing from the spirit and principle of the present embodiments should fall within the protection scope of the present embodiments.

What is claimed is:

1. An apparatus, wherein the apparatus comprises:
   a processor; and
   a non-transitory computer readable storage medium storing a program for execution by the processor, the program including instructions to:
   acquire a working remote radio unit (RRU) set of a user equipment (UE);
   determine a highest signal strength RRU of the UE according to an uplink reference signal received power (RSRP) at which the UE arrives at RRUs in the working RRU set;

screen the working RRU set based on the highest signal strength RRU, to generate a first paired RRU set of the UE;
generate a paired UE set based on the first paired RRU set;
determine whether there is an RRU providing a service to the UE in the first paired RRU set;
determine a second paired RRU set of the UE according to the first paired RRU set and the paired UE set, in response to determining that there is an RRU providing the service to the UE in the first paired RRU set;
determine an actual user attribute of the UE according to the second paired RRU set and an initial user attribute of the UE; and
schedule a resource for the UE according to the actual user attribute of the UE.

2. The apparatus according to claim 1, wherein the instructions to acquire the working RRU set of the UE comprise instructions to:
determine RRUs providing a service to the UE, to acquire the working RRU set formed by the RRUs.

3. The apparatus of claim 2, wherein the instructions to determine the RRUs providing the service to the UE comprise instructions to determine the RRUs providing the service to the UE according to an isolation range of the UE.

4. The apparatus according to claim 1, wherein the instructions to generate the paired UE set comprise instructions to:
acquire UEs served by RRUs in the first paired RRU set; and
form the paired UE set using the UEs served by the RRUs in the first paired RRU set.

5. The apparatus according to claim 4, wherein the instructions to form the paired UE set further comprise instructions to:
screen out a beamforming (BF) user from the UE served by the UE; and
form the paired UE set using the BF user.

6. The apparatus according to claim 1, wherein the instructions further comprise instructions to:
determine that the actual user attribute of the UE is the initial user attribute, in response to there not being an RRU providing the service to the UE in the first paired RRU set.

7. The apparatus according to claim 1, wherein the instructions to determine the second paired RRU set further comprise instructions to:
determine priorities of paired UEs of the paired UE set according to service types of the UEs in the paired UE set;
perform correlation calculation on the paired UEs of the paired UE set and on the UE;
sequentially determine, according to the priorities of the paired UEs of the paired UE set in descending order, whether the paired UEs of the paired UE set have correlations with the UE;
acquire a working RRU of a highest priority paired UE, and delete the working RRU of the highest priority paired UE from the first paired RRU set, to obtain the second paired RRU set, in response to the highest priority paired UE having a correlation with the UE;
sequentially determine, according to the priorities of the paired UEs of the paired UE set in descending order, whether rest paired UEs in the paired UE set have a correlation with the UE, in response to the highest priority paired UE not having a correlation with the UE; and
process the highest priority paired UE having the correlation with the UE by processing the highest priority paired UE, to obtain the second paired RRU set, in response to there being an paired UE having the correlation with the UE in the rest paired UEs in the paired UE set.

8. The apparatus according to claim 7, wherein the instructions further comprise instructions to:
determine that the actual user attribute of the UE is the initial user attribute, in response to there not being a UE having a correlation with the UE does in the rest paired UEs in the paired UE set, after sequentially determining.

9. The apparatus according to claim 7, wherein the instructions to determine the actual user attribute of the UE comprise instructions to:
determine the actual user attribute of the UE according to the initial user attribute of the UE, in response to there not being an RRU providing the service to the UE in the second paired RRU set; and
according to the priorities of the paired UEs of the paired UE set in descending order, re-determine a new second paired RRU set according to rest paired UEs in the paired UE set and the first paired RRU set, until there is not an RRU providing a service to the UE in a new second paired RRU set, in response to there being an RRU providing the service to the UE in the second paired RRU set.

10. The apparatus according to claim 9, wherein the user attribute of the UE is an all joint-scheduling user, a partial joint-scheduling user, or an independent-scheduling user, and wherein the instructions to determine the actual user attribute of the UE according to the initial user attribute of the UE, further comprise instructions to:
determine that the actual user attribute of the UE is a partial joint-scheduling user in response to the initial user attribute of the UE being an all joint-scheduling user; and
determine that the actual user attribute of the UE is an independent-scheduling user in response to the initial user attribute of the UE being a partial joint-scheduling user.

11. A method, wherein the method comprises:
acquiring, by an apparatus, a working remote radio unit (RRU) set of a user equipment (UE);
determining a highest signal strength RRU for the UE according to uplink reference signal received powers (RSRPs) at which the UE arrives at RRUs in the working RRU set;
screening the working RRU set based on the highest signal strength RRU, to generate a first paired RRU set of the UE;
generating a paired UE set based on the first paired RRU set;
determining whether there is an RRU providing a service to the UE in the first paired RRU set;
determining a second paired RRU set of the UE according to the first paired RRU set and the paired UE set, in response to there being an RRU providing a service to the UE in the first paired RRU set;
determining an actual user attribute of the UE according to the second paired RRU set and an initial user attribute of the UE; and scheduling a resource for the UE according to the actual user attribute of the UE.

12. The method according to claim ii, wherein acquiring the working RRU set of UE comprises:
    determining RRUs providing a service to the UE, to acquire the working RRU set formed by the RRUs.

13. The method according to claim ii, wherein generating the paired UE set comprises:
    acquiring UEs served by RRUs in the first paired RRU set; and
    forming the paired UE set busing the UEs served by the RRUs in the first paired RRU set.

14. The method according to claim ii, wherein forming the paired UE set further comprises:
    screening out a beamforming (BF) user from the UE served by the RRUs in the working RRU set; and
    forming the paired UE set using the BF user.

15. The method according to claim ii, further comprising:
    determining that the actual user attribute of the UE is the initial user attribute, in response to there not being an RRU providing the service to the UE in the first paired RRU set.

16. The method according to claim ii, wherein determining the second paired RRU set of the UE comprises:
    determining priorities of paired UEs of the paired UE set according to service types of the UEs in the paired UE set;
    performing correlation calculation on the paired UEs of the paired UE set and on the UE;
    sequentially determining, according to the priorities of the paired UEs of the paired UE set in descending order, whether the paired UEs of the paired UE set have correlations with the UE;
    acquiring a working RRU of a highest priority paired UE, and deleting the working RRU of the highest priority paired UE from the first paired RRU set, to obtain the second paired RRU set, in response to the highest priority paired UE having a correlation with the UE;
    sequentially determining, according to the priorities of the paired UEs of the paired UE set in descending order, whether rest paired UEs in the paired UE set have correlations with the UE, in response to the highest priority paired UE not having a correlation with the UE; and
    processing the highest priority paired UE having the correlation with the UE by processing the highest priority paired UE to obtain the second paired RRU set, in response to there being a paired UE having a correlation with the UE in the rest paired UEs in the paired UE set.

17. The method according to claim 16, further comprising:
    determining that the actual user attribute of the UE is the initial user attribute, in response to there not being a UE having a correlation with the UE in the rest paired UEs in the paired UE set.

18. The method according to claim ii, wherein determining the actual user attribute of the UE comprises:
    determining the actual user attribute of the UE according to the initial user attribute of the UE, in response to there not being an RRU providing the service to the UE in the second paired RRU set; and
    according to priorities of the paired UEs in the paired UE set in descending order, re-determining a new second paired RRU set according to rest paired UEs in the paired UE set and the first paired RRU set, until there is not an RRU providing a service to the UE in a new second paired RRU set, in response to there being an RRU providing the service to the UE in the second paired RRU set.

19. The method according to claim 18, wherein the user attribute of the UE is an all joint-scheduling user, a partial joint-scheduling user, or an independent-scheduling user; and wherein determining the actual user attribute of the UE according to the initial user attribute of the UE comprises:
    determining that the actual user attribute of the UE is a partial joint-scheduling user, in response to the initial user attribute of the UE being an all joint-scheduling user; and
    determining that the actual user attribute of the UE is an independent-scheduling user, in response to the initial user attribute of the UE being a partial joint-scheduling user.

20. A non-transitory computer readable storage medium storing a program for execution by a processor, the program including instructions to:
    acquire a working remote radio unit (RRU) set of a user equipment (UE);
    determine a highest signal strength RRU of the UE according to an uplink reference signal received power (RSRP) at which the UE arrives at RRUs in the working RRU set;
    screen the working RRU set based on the highest signal strength RRU, to generate a first paired RRU set of the UE;
    generate a paired UE set based on the first paired RRU set;
    determine whether there is an RRU providing a service to the UE in the first paired RRU set;
    determine a second paired RRU set of the UE according to the first paired RRU set and the paired UE set, in response to determining that there is an RRU providing the service to the UE in the first paired RRU set;
    determine an actual user attribute of the UE according to the second paired RRU set and an initial user attribute of the UE; and
    schedule a resource for the UE according to the actual user attribute of the UE.

* * * * *

UNITED STATES PATENT AND TRADEMARK OFFICE
CERTIFICATE OF CORRECTION

PATENT NO. : 10,149,312 B2
APPLICATION NO. : 15/581582
DATED : December 4, 2018
INVENTOR(S) : Junjie Yan Page 1 of 1

It is certified that error appears in the above-identified patent and that said Letters Patent is hereby corrected as shown below:

In the Claims

In Column 25, Line 3, Claim 12, delete "claim ii" and insert --claim 11--.

In Column 25, Line 7, Claim 13, delete "claim ii" and insert --claim 11--.

In Column 25, Line 13, Claim 14, delete "claim ii" and insert --claim 11--.

In Column 25, Line 18, Claim 15, delete "claim ii" and insert --claim 11--.

In Column 25, Line 23, Claim 16, delete "claim ii" and insert --claim 11--.

In Column 26, Line 1, Claim 18, delete "claim ii" and insert --claim 11--.

Signed and Sealed this
Nineteenth Day of March, 2019

Andrei Iancu
*Director of the United States Patent and Trademark Office*